March 20, 1962 D. W. BATTEAU 3,026,363
THERMAL ELEMENT FOR MEASURING TRUE R.M.S. OF RANDOM SIGNALS
Filed Aug. 28, 1959

INVENTOR.
DWIGHT W. BATTEAU
BY
Porter, Chittick & Russell
ATTORNEYS

United States Patent Office 3,026,363
Patented Mar. 20, 1962

3,026,363
THERMAL ELEMENT FOR MEASURING TRUE R.M.S. OF RANDOM SIGNALS
Dwight W. Batteau, Cambridge, Mass., assignor to Flow Corporation, Arlington, Mass., a corporation of Massachusetts
Filed Aug. 28, 1959, Ser. No. 836,719
1 Claim. (Cl. 136—4)

This invention relates to thermocouple units and more particularly to a thermocouple unit especially suitable for use in root-mean-square measurements of random electrical signals, either frequency-filtered or broad band.

The task of measuring the average square of a voltage signal which is random in character and might contain very large peaks is significantly different from the task of measuring the R.M.S. value of a periodic signal. The R.M.S. value of any periodic wave can be measured by a scheme applicable to only one period. Thus, a short averaging time (at least one period, but, for stability, ten periods) is adequate for any periodic wave, even though it is not a sine wave. When random signals are measured, there are additional requirements imposed on the averaging time. For example, in the case of white noise, the bandwidth of the signal determines the averaging time required; the output of spectrum analyzers having a 100 c.p.s. pass band must be averaged for at least 10 seconds (time constant) to give a reliable result, and narrower bands must be averaged longer. Measurements of turbulence, aircraft noise, random vibration, or similar phenomena containing high-energy, low-frequency components (often below 5 c.p.s.) require comparably long averaging time to give reliable data. In addition to averaging time, there are the problems of sensitivity and peak amplitude. A suitable measuring system must have good sensitivity and must be able to withstand large overloads (on the order of ten times the average signal level) without distortion or danger of damage.

Heretofore, it has been recognized that the R.M.S. values of random signals can be measured by means of a system which measures the heat output of a resistor to which is applied the random voltage to be measured. However, attainment of an accurate measuring system has been limited by the unavailability of a device for generating an output voltage proportional to the power of the random signal to be measured which exhibits high sensitivity and can withstand high peak to R.M.S. ratios in the input signal.

The object of the present invention is to provide a novel thermosensitive element for use in generating a measuring signal proportional to the R.M.S. value of a random voltage applied to a known resistor.

A more specific object is to provide a novel thermal element in the form of a unitary assembly of a plurality of series-connected thermocouples and a resistor to which is applied a random signal for measurement of its R.M.S. value.

Other objects and many of the attendant advantages of the invention will be more readily appreciated as the invention becomes better understood by reference to the following detailed description when considered in connection with the accompanying drawing, wherein.

Figure 3:
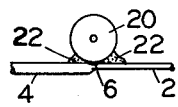
FIG. 3 is a fragmentary end view showing how the resistor is attached to the coil element.
Figure 1:
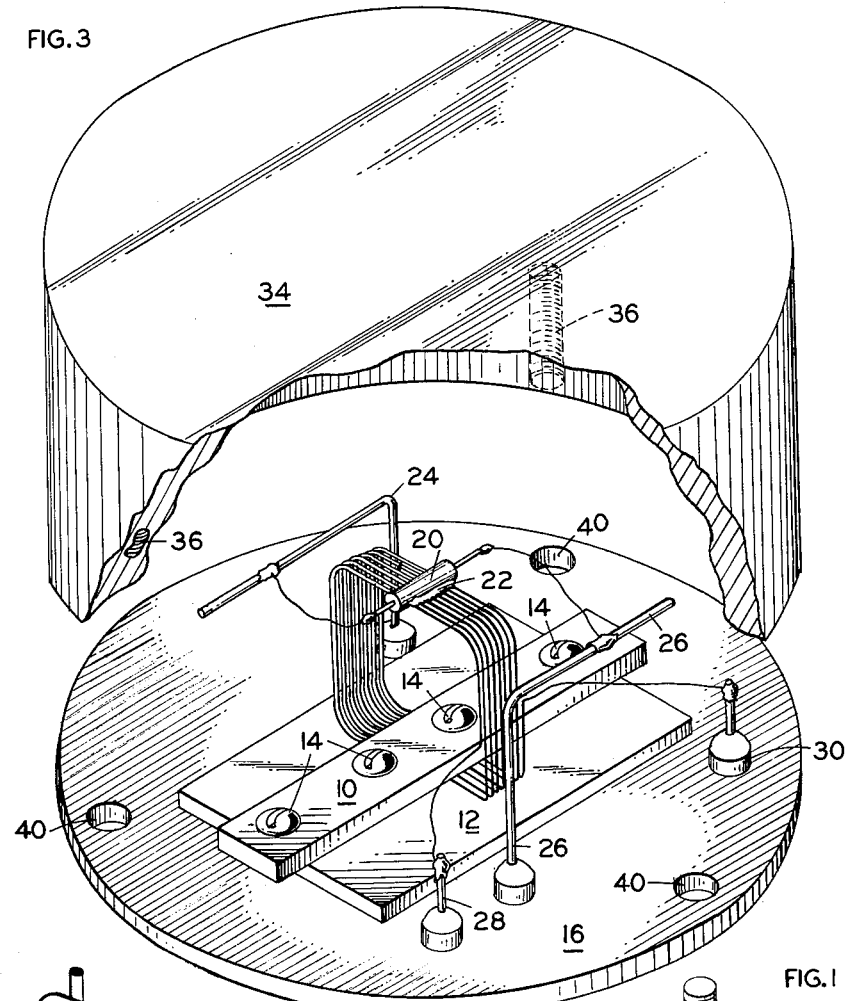
FIG. 1 is a perspective of a preferred embodiment of the invention.
Figure 2:
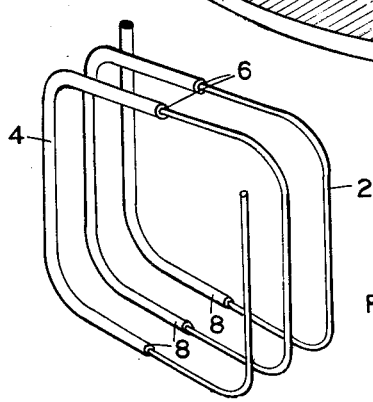
FIG. 2 is an enlarged perspective view of a portion of the coil element shown in FIG. 1.

The present invention comprises a spiral winding of constantan wire 2 with each turn having a copper plating 4 over half of its length, thereby providing a first row of thermocouple junctions 6 along one side and a second row of thermocouple junctions 8 along the opposite side of the winding. FIG. 2 exaggerates the thickness of the copper plating 4. This winding is oriented with one row of junctions (in this case, junctions 8) down, and these junctions are clamped between a bar 10 of anodized aluminum and a sheet 12 of anodized aluminum by means of screws 14. Screws 14 also function to secure sheet 12 to a brass plate 16.

Secured to junctions 6 is an electrically insulated resistor 20. Resistor 20 is secured to the turns of the winding by a suitable electrically non-conductive cement 22. It may be a ceramic cement or a plastic cement such as a cyanoacrylate monomer which polymerizes when pressed between two surfaces into a thin film.

The brass plate is provided with four insulated lead-through terminals 24, 26, 28 and 30. The opposite ends of resistor 20 are connected to terminals 24 and 26. The opposite ends of the winding are connected to terminals 28 and 30. Terminals 24 and 26 are used to apply a suitable input to the resistor. The output developed by the thermocouple assembly is taken across terminals 28 and 30.

Junctions 6 are the "hot" junctions since they are heated by the heat generated by the resistor, and junctions 8 are the "cold" junctions since they are kept cool by conduction through bar 10 and sheet 12 to brass plate 16, which functions as a heat sink. The temperature difference between the junctions 6 and the junctions 8 generates an output voltage proportional to this difference. This means that the output is proportional to the mean-square of the signal voltage applied to terminals 24 and 26.

The averaging time depends principally on the mass of the resistor and on the total area of contact with the thermocouple junctions. The sensitivity depends largely on the number of junctions in the thermopile. By using a large number of junctions, a large output voltage can be obtained when the power dissipated in the resistor is very small, thus automatically providing overload protection.

The significant feature of the foregoing device is the use of bar 10 and sheet 12 to connect junctions 8 to heat sink 16. Bar 10 and sheet 12 are both made of anodized aluminum. The anodized surface (aluminum oxide) has the remarkable property of high thermal conductivity combined with high electrical resistance. Consequently, bar 10 and plate 12 simultaneously provide excellent heat transfer and excellent electrical insulation between the cold junctions 8 and heat sink 16. The clamp formed by bar 10 and plate 12 prevents relative movement of the turns of the winding, thereby cooperating with cement 22 to help prevent the turns from separating or coming together. Use of materials such as mica to prevent electrical contact between the cold junctions and the cold sink has been found unsatisfactory due to poor heat transfer. Good heat transfer between the cold junctions and the cold sink is essential since the output voltage is proportional to the temperature difference between the hot and cold junctions.

To further improve the operation of the device, it is preferred to enclose the resistor and thermopile in a heavy brass can 34. Can 34 has tapped holes 36 and is secured down on brass plate 16 by brass screws 38. Holes 40 are provided in plate 16 to accommodate screws 38. Thus, can 34 and plate 16 form a large cold sink which not only encloses the device to protect it from moisture, dust, etc., but also prevents stray breezes from cooling the resistor.

The present invention has the advantage of small size so that it can be incorporated readily in an instrument. It has been determined that increasing the diameter of the winding produces an increase in sensitivity without affecting the time constant of the thermopile. However, the invention is so effective that it can be kept small in size and weight. Thus, in practice, a most satisfactory thermal element has been made using a spiral winding with a diameter of about 0.5 inch made from constantan wire with a diameter of about 0.010 inch.

Obviously, many modifications and variations of the invention are possible in the light of the foregoing teachings. It is to be understood, therefore, that the invention is not limited in its application to the details of construction and arrangement of parts specifically described or illustrated, and that within the scope of the appended claim, it may be practiced otherwise than as specifically described or illustrated.

I claim:

Apparatus for producing an output electric signal proportional to the R.M.S. value of an input electrical signal comprising, a closed fluid filled container, at least one side thereof being fabricated from aluminum and having a coating of aluminum oxide thereon, a thermocouple having at least one hot and one cold junction mounted within said container, said at least one cold junction being in thermally conductive relationship to said aluminum oxide coated side of said container, a resistor mounted within said container and in thermally conductive relationship to said at least one hot junction, means projecting through said container to connect said resistor to said input electrical signal, and means projecting through said container to connect the output signal of said thermocouple to an output circuit.

References Cited in the file of this patent

UNITED STATES PATENTS

| | | |
|---|---|---|
| 1,357,850 | Derr | Nov. 2, 1920 |
| 1,612,897 | Zethmayr | Jan. 4, 1927 |
| 1,996,943 | Wile | Apr. 9, 1935 |
| 2,122,262 | Nergaard | June 28, 1938 |
| 2,178,548 | Black et al. | Nov. 7, 1939 |
| 2,310,026 | Higley | Feb. 2, 1943 |
| 2,594,618 | Booth | Apr. 29, 1952 |
| 2,807,657 | Jenkins et al. | Sept. 24, 1957 |

OTHER REFERENCES

Schroeder: Electrical Engineering, August 1949, page 685.